3,322,626
MEDICINAL COMPOSITION FOR TREATING ACNE AND METHOD OF USING SAME
Russell N. D'Argento, Waltham, Mass., assignor to Pannett Products Inc., New York, N.Y., a corporation of New York
No Drawing. Continuation of application Ser. No. 746,338, July 3, 1958. This application June 13, 1963, Ser. No. 287,480
8 Claims. (Cl. 167—55)

This application is a continuation application of my parent application Serial No. 746,338, filed July 3, 1958, now abandoned.

This invention relates to a medicinal composition to treat acne and skin infections.

One object of my invention is to provide a medicinal composition that will act upon any undigested fats in a person's intestines, so that such fats which may cause acne and other skin infections, will be disposed of.

Another object is to add to the vitality of a person and build up resistance to acne and the like, because a person so suffering, needs, or can advantegeously use, a food supplement and an aid to digestion. Thus, there may be provided a medicinal composition, which will be received, and dispersed, in a person's stomach.

My medicinal composition, whether with, or without, an outer medicinal shell for the stomach, reaches the small intestine where it is acted upon. It includes pancreatin and bile salts, and preferably more pancreatin than bile salts, as for instance, two parts of pancreatin to one part of bile salts, by weight. They are mixed together, and provided with an enteric outer coating, to form a tablet or pill, hence will remain intact and pass through the stomach unchanged, and into the small intestine.

Said pancreatin participates in the intestinal digestion of protein, starch and fat, acting upon food substances in the smaller intestine.

Said bile salts, in the smaller intestine, play a significant role in emulsification of fats, and promoting absorption.

The desirable proportions in this pill, which may serve as an inner core, are 250 milligrams of pancreatin and 150 milligrams of bile salts, with an enteric coating thereon.

Since a person suffering from acne is unable to fully dispose of fats that reach the smaller intestine, my composition supplies additional pancreatin, and bile, thus enabling the body to complete intestinal functions which otherwise would be incompleted.

My medicinal composition preferably will have an outer shell which includes vitamin A and vitamin C. Pepsin also is desirable. For instance, there are 15,000 units of vitamin A, 50 milligrams of vitamin C, and 150 milligrams of pepsin. These ingredients, to a substantial extent, are acted upon while in the stomach and ultimately serve to maintain the normal vitality of epithelial tissues.

An average dosage, whether with or without the outer shell, would be one tablet after each meal until the condition being treated is corrected.

What I claim is:

1. A medicinal composition useful in the treatment of acne when taken internally by oral administration thereof, comprising: a vitamin agent mixture of vitamin A and vitamin C, said vitamin agent being releasable in the stomach for maintaining the normal vitality of epithelial tissue, and an agent for improving the digestion of fats and fatty proteins which comprises pancreatin and bile salts, said pancreatin and bile salts being enteric coated so as to be releasable in the intestine.

2. A medicinal composition according to claim 1 wherein there is incorporated pepsin, said pepsin being releasable in the stomach.

3. A medicinal composition useful in the treatment of acne when taken internally by oral administration thereof, comprising an outer shell embodying vitamin A, vitamin C and pepsin, and an inner core having an enteric coating and containing therein pancreatin and bile salts, the pacreatin exceeding the bile salts by weight.

4. A medicinal composition according to claim 3, wherein vitamin A is in an amount of 15,000 units, vitamin C is in an amount of 50 milligrams, pepsin is in an amount of 150 milligrams, pancreatin is in an amount of 250 milligrams and bile salts are in an amount of 150 milligrams.

5. The method of treating acne comprising administering orally a medicinal composition comprising a vitamin agent releasable in the stomach for maintaining the normal vitality of epithelial tissue, said vitamin agent comprising a mixture of vitamin A and vitamin C and an agent for improving the digestion of fats and fatty proteins.

6. The method of treating acne comprising administering orally a medicinal composition useful in the treatment of acne when taken internally by oral administration thereof, comprising a vitamin agent which comprises a mixture of vitamin A and vitamin C, said vitamin agent being releasable in the stomach for maintaining the normal vitality of epithelial tissue, and an agent for improving the digestion of fats and fatty proteins which comprises pancreatin and bile salts, said pancreatin and bile salts being enteric coated so as to be releasable in the intestine.

7. The method of treating acne according to claim 6 wherein there is incorporated pepsin, said pepsin being releasable in the stomach.

8. The method of treating acne according to claim 7, wherein vitamin A is in an amount of 15,000 units, vitamin C is in an amount of 50 milligrams, pepsin is in an amount of 150 milligrams, pancreatin is in an amount of 250 milligrams and bile salts are in an amount of 150 milligrams.

References Cited

Howard: Modern Drug Encyclopedia, sixth edition, 1955, page 385, Drug Publications, New York, N.Y.

Juster: Current List of Medical Literature, vol. 30, No. 3, September 1956, Item No. 24720 (1 page).

Physicians Desk Reference (P.D.R.), eleventh edition, 1957, published by Medical Economics, Inc., Oradell, N.J., pages 445 and 446.

ALBERT T. MEYERS, *Primary Examiner.*

LEWIS GOTTS, *Examiner.*

JULIAN S. LEVITT, SAM ROSEN, *Assistant Examiners.*